Dec. 25, 1951  P. K. CHATTERJEA  2,579,473
ARRANGEMENT FOR SELECTING ELECTRIC PULSES OF GIVEN WIDTH
Filed March 1, 1947
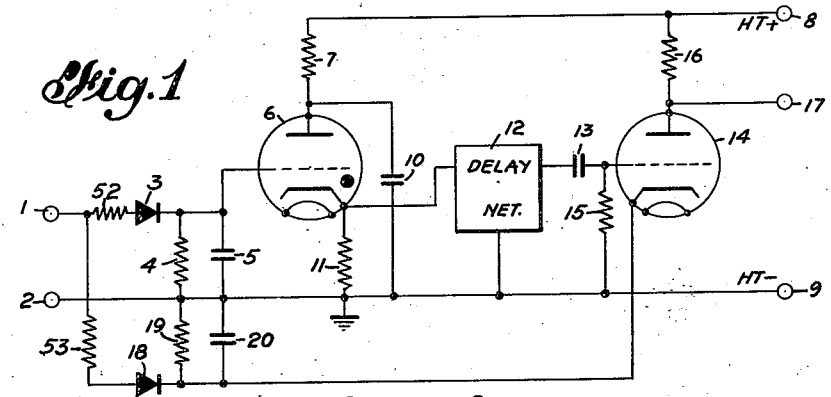
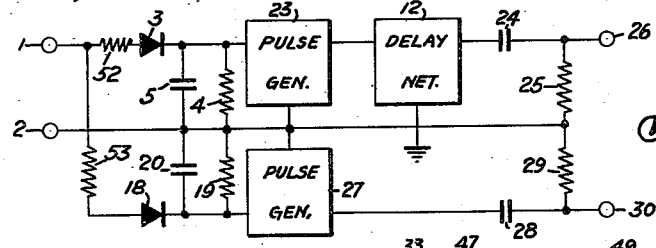
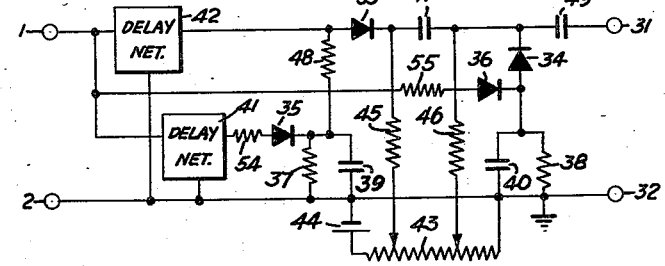
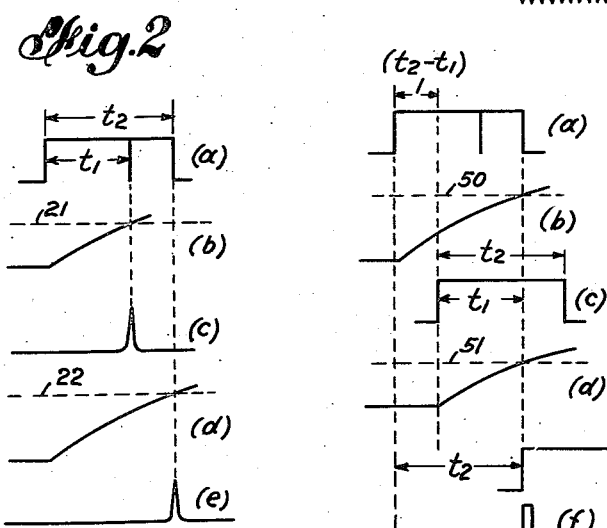
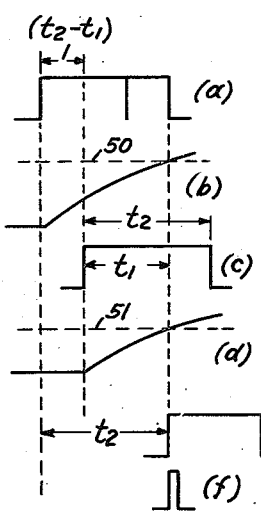
INVENTOR
PRAFULLA K. CHATTERJEA
BY
ATTORNEY Patented Dec. 25, 1951

2,579,473

UNITED STATES PATENT OFFICE 2,579,473

ARRANGEMENT FOR SELECTING ELECTRIC PULSES OF GIVEN WIDTH

Prafulla Kumar Chatterjea, London, England, assignor to International Standard Electric Corporation, New York, N. Y., a corporation of Delaware Application March 1, 1947, Serial No. 731,793
In Great Britain December 7, 1945

Section 1, Public Law 690, August 8, 1946
Patent expires December 7, 1965

7 Claims. (Cl. 250—27)

The present invention relates to arrangements for selecting electric pulses having durations which lie between certain fixed limits, from pulses of other durations.

In electric communication systems and the like employing pulses, it frequently happens that pulses bearing certain particular intelligence have to be picked out from a series of pulses carrying other intelligence. Such pulses may be distinguished either by their repetition frequency, or by their times of occurrence in relation to other pulses, or by some characteristic form factor. The latter type of distinction is often the only certain means of recognising pulses when the timing of the pulses is more or less random. One characteristic form factor is the duration of the pulse, the pulse being supposed to be of constant amplitude.

The object of the present invention is to provide simple means for picking out pulses whose duration lies between specified limits.

The invention accordingly provides an arrangement for generating an output pulse in response exclusively to an applied input pulse having a duration within specified time limits, comprising means for applying the rectangular pulse gradually to store energy in each of two energy storage devices, means for applying the energy acquired by one of the devices to initiate the output pulse only if the said duration is at least equal to the lower time limit, and means for applying the energy acquired by the other device to suppress the output pulse only if the said duration exceeds the upper time limit.

The invention will be described with reference to the accompanying drawing in which:

Fig. 1 shows a schematic circuit diagram of one embodiment of the invention;

Fig. 2 shows diagrams used in explaining the action of Fig. 1;

Figs. 3 and 4 show two other embodiments; and

Fig. 5 shows diagrams used in explaining the action of Fig. 4.

Fig. 1 shows one pulse selecting arrangement according to the invention. It will be assumed that a series of pulses of various durations are applied to the input terminals 1 and 2 of the selecting arrangement (in positive sense to terminal 1) after having passed through a suitable amplitude limiter (not shown) in order to ensure that all pulses have the same amplitude. It will be further assumed that it is desired to select all pulses whose durations lie between two predetermined limits $t_1$ and $t_2$ and to reject all other pulses.

Terminal 1 is connected through a resistance 52 and a rectifier 3 to a resistance 4 and condenser 5 connected in parallel to the ground terminal 2.

The elements 4 and 5 are also connected to the control grid of a gas filled tube 6 which acts as a pulse generator, and is intended to generate a single short pulse in circumstances which will be explained later. The anode of the tube 6 is connected through a resistance 7 to the positive terminal 8 for the high tension supply source (not shown), the negative terminal 9 of which is connected to ground. The anode is also connected to ground through condenser 10, and the cathode is grounded through a resistance 11.

The cathode is also connected through a delay network 12 of any suitable type and a blocking condenser 13 to the control grid of an amplifying valve 14, which grid is also connected to ground through a resistance 15.

The anode of the valve 14 is connected through a resistance 16 to terminal 8, and directly to an output terminal 17.

Terminal 1 is also connected through resistance 53 and a second rectifier 18 to a condenser 19 and resistance 20 connected in parallel to ground. Elements 19 and 20 are also connected to the cathode of the valve 14 as shown.

The tube 6 should be so biassed and polarised that it is normally not ionised. The condenser 10 will then be charged substantially to the potential of the high tension source. When a pulse arrives at terminals 1 and 2, the condenser 5 begins to charge through resistance 53 so that the potential of the control grid of tube 6 increases positively from zero. If the applied pulse lasts long enough, the potential of the control grid will rise until the tube is fired, causing the condenser 10 to discharge through the resistance 11. The resulting fall of potential of the anode extinguishes the tube, and a short pulse of potential is generated across the cathode resistance 11. This short pulse is applied after a certain delay in the network 12 to the amplifying valve 14, and may be obtained at terminal 17.

The pulse at terminals 1 and 2 also commences to charge the condenser 20 through resistance 53. If the input pulse should exceed a certain duration, the potential of the cathode of the valve 14 may be raised to such a value that the short pulse applied to the control grid cannot produce any output at terminal 17.

Referring to Fig. 2, an input pulse is shown at (a), the abovementioned maximum and minimum limits $t_2$ and $t_1$ of the duration being indicated. The condenser 5 charges up as shown at (b), the commencement of the charging coinciding with the leading edge of the pulse. The time constant of the elements 4, 5 and 52 should be so chosen that after the minimum duration $t_1$ the potential of the condenser has risen just sufficiently to fire the tube 6. This potential is indicated by the dotted line 21 in curve (b), which intersects the charging curve at time $t_1$. It will be evident that if the applied pulse does not last as long as $t_1$, the tube 6 will not be fired. However, if the applied pulse lasts longer than $t_1$, the tube 6 will be fired at $t_1$, whatever the duration of the pulse, and will generate a short pulse at $t_1$ as shown at (c) Fig. 2.

In a similar manner, the condenser 20 commences to charge up on the occurrence of the leading edge of the applied pulse, as shown at (d) Fig. 2, and eventually will reach a limiting potential 22 which just prevents the valve 14 from passing the short pulse. The time constant of the elements 19, 20 and 53 should therefore be chosen so that this limiting potential is reached after a time $t_2$. The network 12 should be arranged to delay the pulse (d) by the period $t_2-t_1$, so that it arrives at the control grid just at the end of the period $t_2$ as shown at (e), Fig. 2. If the applied pulse lasts longer than $t_2$, the valve 14 will be prevented from passing the delayed short pulse (e).

Thus it will be clear that unless the duration of the applied pulse is less than $t_1$ or greater than $t_2$, a short pulse will be obtained at the output terminal 17, this short pulse occurring a fixed time $t_2$ after the leading edge of the applied pulse.

The short pulse may be employed in known manner to operate a gating circuit (not shown) to which all the incoming pulses are applied after appropriate delay, so that only a pulse having duration between the limits $t_1$ and $t_2$ will be admitted.

The short pulse may be generated by any known means other than the gas-filled tube illustrated, capable of being switched from a normal or rest condition by a limiting potential, such as the well known multivibrator device consisting of two valves each having its anode coupled to the control grid of the other valve. The rectifiers 3 and 4 may be dry contact rectifiers or diodes or the like, and are provided to prevent the discharge of the condensers through the pulse input circuit.

Fig. 3 shows an alternative form of the invention. In this figure, the elements 1 to 5, 12 and 18 to 20, and 52 and 53 are the same as in Fig. 1. The elements 4 and 5 are connected to a pulse generator 23 which may be a gas-filled tube arranged in the same way as the tube 6 in Fig. 1. The short pulse generated by 23 is delayed in the network 12 and applied through a blocking condenser 24 to a load resistance 25 connected to ground. An output terminal 26, is connected to the junction point of elements 24 and 25.

The elements 19 and 20 are connected to a second pulse generator 27 which should preferably be the same as 23 and should be adapted to generate a similar short pulse which is applied through a blocking condenser 28 to a load resistance 29, an output terminal 30 corresponding to 26 being provided.

The upper half of the circuit operates in the same way as the corresponding half of Fig. 1, and provided that the applied pulse has a duration at least equal to $t_1$, a short pulse will be generated across the resistance 25.

Likewise, if the duration of the applied pulse should be equal to or greater than $t_2$ a short pulse will be generated across the resistance 29 at the time $t_2$, and if the short pulse generated by the generator 23 is delayed by $t_2-t_1$ as before, the two short pulses appearing across resistances 25 and 29 will coincide in time and no potential difference will appear between the output terminals 26 and 30 provided that the circuit arrangements have been chosen so that the pulses are equal in amplitude. Thus in the case of Fig. 3, a short pulse will be obtained at the output terminals 26 and 30 only if the duration of the applied pulse lies between $t_1$ and $t_2$.

Fig. 4 shows another embodiment of the invention operating on slightly different principles. In this figure there is a principal path for the pulses running between the input terminals 1, 2 and the output terminals 31, 32. This path includes a series rectifier 33 and a shunt rectifier 34, the first of which is normally biassed into a non-conducting condition to act as a shut gate which is opened to admit the leading edge of the applied pulse only if the applied pulse has a duration at least equal to $t_1$, while the shunt rectifier 34 is also normally biassed into a non-conducting condition to act as an open gate which is shut against the said leading edge if the applied pulse lasts longer than $t_2$. Thus a pulse is obtained at the output terminals 31 and 32 only if the applied pulse has a duration within the specified limits.

The control of the rectifiers 33 and 34 is obtained by two auxiliary paths to which the incoming pulses are also applied, these paths respectively including blocking rectifiers 35 and 36, series resistances 54 and 55, shunt resistances 37 and 38, and condensers 39 and 40 arranged in the same way as the corresponding elements 3, 4 and 5 and 52 of Fig. 1. A delay network 41 precedes resistance 54 and another delay network 42 is connected at the input end of the principal path. An adjustable biassing source for the two rectifiers 33 and 34 is provided by a potentiometer resistance 43 having one end connected to the ground terminals 2 and 32 and the other end to the positive terminal of a grounded direct current source 44. The cathode or negative pole of the rectifier 33 is connected to one adjustable tap on the resistance 43 through a resistance 45, and the cathode or negative pole of the rectifier 34 is connected to another adjustable contact on the resistance 43 through a resistance 46, the two rectifiers being separated by a blocking condenser 47. The junction point of the elements 35, 37 and 39 is connected to the anode or positive pole of the rectifier 33 through a resistance 48, and the junction point of the elements 36, 38 and 40 is connected directly to the anode or positive pole of the rectifier 34. The output terminal 31 is connected to the rectifier 34 through a blocking condenser 49.

The curves of Fig. 5 will be used to explain the action of Fig. 4. The incoming pulse shown at (a) Fig. 5 is applied without any delay to the elements 55, 36, 38 and 40 and the condenser 40 begins to charge up as indicated by the curve (b). The time constant should be chosen so that after a time $t_2$, the potential of the condenser 40 has risen sufficiently just to overcome the bias of the rectifier 34, indicated by the dotted line 50, so that it is in a conducting condition and the corresponding gate is shut. Unless the applied pulse lasts at least for a time $t_2$, this gate will remain open.

The delay network 42 should be adjusted to delay the applied pulse by the time $t_2$ so that it will appear as shown at (e) Fig. 5. Unless therefore the pulse duration exceeds $t_2$ the leading edge will find the gate open.

The delay network 41 should be adjusted to delay the applied pulse by the time $t_2-t_1$ so that the pulse applied to the resistance 54 will be shown at (c) Fig. 5. The time constant of the elements 54, 37 and 39 should be chosen so that after a time $t_1$ the potential of the condenser 39 has risen as shown at (d) Fig. 5, just sufficiently to overcome the bias of the rectifier 33 indicated by the dotted line 51. If the applied pulse lasts at least a time $t_1$, then the leading edge of the pulse shown at (e) will find this gate open also, so that a short pulse (f), Fig. 5, will appear at the output terminals 31 and 32, provided the other gate is also open, which will be the case if the pulse duration does not exceed $t_2$, as already explained.

In order to provide a small margin to ensure there shall be a short period during which both gates are open, the adjustments should preferably be made so that the first gate is opened slightly early, for example by making the delay introduced by the network 41 very slightly less than $(t_2-t_1)$. This will ensure that an output pulse f will always be obtained if the duration of the applied pulse is within the specified limits.

It will be understood that the performance of the circuit depends on the time constant of the elements 37, 39, 54 and 38, 40, 55 and also on the initial bias of the corresponding rectifiers. By making this bias variable, the circuit may be easily adjusted to operate as desired. If the delay networks are also made adjustable, the circuit may be very conveniently re-adjusted to select pulses according to different values of the limits $t_1$ and $t_2$.

As in the case of Fig. 1 or 3, the short pulse obtained at the output terminals may be applied to control an appropriate gating circuit (not shown) for selecting the pulses having the specified duration.

It will be understood that the potential acquired by the condenser 5 in Fig. 1 by firing the tube 6 initiates the output pulse if the input pulse duration is at least equal to $t_1$. Likewise, in Fig. 4 the potential acquired by the condenser 39 initiates the output pulse by permitting the input pulses to pass the rectifier 33 if the duration of the input pulse is not less than $t_1$. In Fig. 1 the valve 14 and in Fig. 4 the rectifier 34, suppresses the output pulse if the input pulse duration exceeds $t_2$.

What is claimed is:

1. An arrangement for generating an output pulse in response exclusively to an applied input pulse having a duration within specified time limits, comprising means for applying the input pulse gradually to store energy in each of two energy storage devices, means for applying the energy acquired by one of the devices to initiate the output pulse only if the said duration is at least equal to the lower time limit, and means for applying the energy acquired by the other device to suppress the output pulse only if the said duration exceeds the upper time limit.

2. An arrangement for generating an output pulse in response exclusively to an applied input pulse having a duration within specified time limits, comprising means for applying the input pulse gradually to charge each of two condensers, means for applying the potential acquired by one condenser to initiate the output pulse only if the said duration is at least equal to the lower time limit, and means for applying the potential acquired by the other condenser to suppress the output pulse only if the said duration exceeds the upper time limit.

3. An arrangement according to claim 2 comprising two resistances respectively shunting the said condensers, and two further resistances connected respectively between the condensers and the source of the rectangular pulses.

4. An arrangement according to claim 3 comprising a generator of single pulses, means for applying the potential acquired by the first mentioned condenser to the generator to initiate a single pulse, means for delaying the single pulse by a time substantially equal to the difference between the limits, and means for applying the delayed pulse to an amplifier controlled by the potential acquired by the second mentioned condenser, the arrangement being such that the first potential is insufficient to initiate the single pulse unless the rectangular pulse lasts for a time at least equal to the lower limit, and such that the second potential is sufficient to block the amplifier if the rectangular pulse lasts longer than the upper limit.

5. An arrangement according to claim 3 comprising two generators of single pulses, means for applying the potentials acquired by the said condensers respectively to the generators to initiate a single pulse from each of them, means for delaying one of the single pulses by a time substantially equal to the difference between the limits, and means for combining the delayed and undelayed pulses in opposition, the arrangement being such that the potential acquired by the condenser corresponding to the delayed pulses is insufficient to initiate a pulse unless the rectangular pulse lasts for a time at least equal to the lower limit, and such that the potential acquired by the other condenser is sufficient to initiate a pulse if the rectangular pulse lasts for a time exceeding the upper limit.

6. An arrangement according to claim 3 comprising a principal path connecting the said source to a pair of output terminals, the said principal path including an input delay network, series gating means normally shut and shunt gating means normally open, a second delay network connected between the said source and the first mentioned condenser, means for applying the potential acquired by the first mentioned condenser to open the series gating means only if the rectangular pulse lasts for a time at least equal to the lower limit, and means for applying the potential acquired by the second condenser to shut the shunt gating means only if the rectangular pulse lasts for a time exceeding the upper limit, the first delay network being adjusted to delay the rectangular pulse by a time equal to the upper time limit, and the second delay network being adjusted to delay the rectangular pulse by a time slightly less than the difference between the limits.

7. An arrangement according to claim 6 in which the said gating means each comprises a rectifier, and means for applying a biassing potential to each rectifier so that it is in a nonconducting condition, the potentials acquired by the said condensers being respectively applied to the rectifiers in opposition to the biassing potentials.

PRAFULLA KUMAR CHATTERJEA.

REFERENCES CITED

The following references are of record in the file of this patent:

UNITED STATES PATENTS

| Number | Name | Date |
|---|---|---|
| 2,275,930 | Torcheux | Mar. 10, 1942 |